6/15/76 OR 3,963,326

United States Patent [19]

Buchert

[11] 3,963,326

[45] June 15, 1976

[54] DATA DISPLAY PANELS

[76] Inventor: Claude-Charles Buchert, 10, Boulevard Seneuze, 91440-Bures-sur-Yvette, France

[22] Filed: Mar. 5, 1974

[21] Appl. No.: 448,318

[30] Foreign Application Priority Data

Mar. 7, 1973 France ............................ 73.08080
Feb. 5, 1974 France ............................ 74.03792

[52] U.S. Cl. ............................ 350/266; 340/378 R; 340/380

[51] Int. Cl.² ............................ G05D 24/00

[58] Field of Search .................. 350/266, 269, 96 R; 340/376, 378 R, 373, 380

[56] References Cited

UNITED STATES PATENTS

| | | | |
|---|---|---|---|
| 3,166,635 | 1/1965 | Todt | 350/269 X |
| 3,210,757 | 10/1965 | Jacob | 350/266 X |
| 3,253,274 | 5/1966 | Berman | 340/380 X |
| 3,467,960 | 9/1969 | Hosker | 340/380 X |
| 3,581,307 | 5/1971 | McKim | 340/380 |
| 3,601,914 | 8/1971 | Fuller | 350/269 X |
| 3,825,927 | 7/1974 | Passien | 340/378 R X |

OTHER PUBLICATIONS

Nassimbene: IBM Technical Disclosure Bulletin, vol. 7, No. 1, June 1964, p. 70.

*Primary Examiner*—John K. Corbin
*Assistant Examiner*—F. L. Evans
*Attorney, Agent, or Firm*—Neil F. Markva

[57] ABSTRACT

A module, for a data display panel, comprising a number of elements, each separately controllable to be selectively illuminated or extinguished so as to display any one of a plurality of symbols. The transmission of light to each of the elements of the module is controlled by an individual occulting or blanking member. Each element comprises an optical light transmission system having an input end with a source surface, the illumination of which is controlled by its individual blanking member and an output end with an image surface which reproduces the state of illumination of the source surface. The image surfaces are preferably contiguous with the source surfaces spaced apart. Each image surface may have a different area to its associated source surface and such surfaces may occupy arbitrary relative positions, i.e. not necessarily being directly opposed to one another.

12 Claims, 17 Drawing Figures

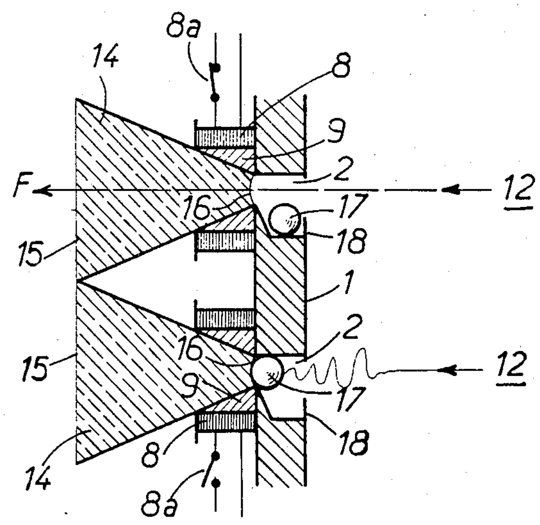
FIG.:3
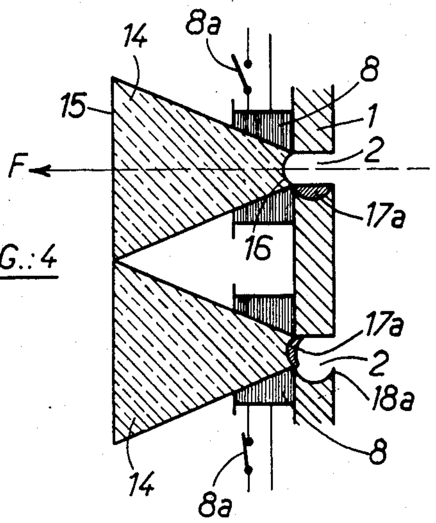
FIG.:4
FIG.:5
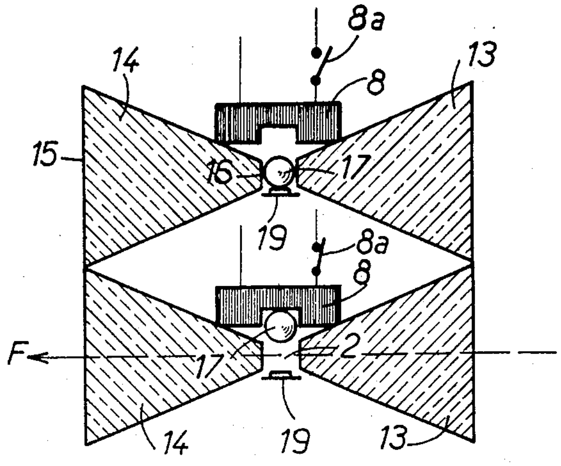

DATA DISPLAY PANELS

BACKGROUND OF THE INVENTION

This invention relates to data display panels and to modules for such display panels.

The panels are suitable for locations, such for example as stations, where the public are to be provided with information in visual form, which is continuously being updated. Nowadays more and more often recourse is being had to remote-controlled display panels which are disposed at carefully selected locations and upon which an operator can cause all the desired information to appear or disappear virtually instantaneously, for example by operating the keys of the data input keyboard at a control console. These display panels are constituted by an arrangement of standard modules assembled upon a chassis integrated into a housing and designed in each case to be capable of displaying as required, any one of the symbols in a series, in particular alphanumerical symbols, that is to say the 26 characters of the alphabet, the ten numerals and, possibly, punctuation symbols. These can be displayed by arranging for them to light up. Each module is to this end equipped with a plurality of light elements which can be made to light up individually from the control console, through the medium of a suitable electronic selection device, the assembly of the illuminated elements of the module defining the shape of the desired symbol which stands out from the background constituted by the assembly of the other, extinguished elements of the module.

SUMMARY OF THE INVENTION

According to the present invention there is provided a module, for a display panel, comprising a plurality of elements each separately controllable to be selectively illuminated or extinguished so as to display any one of a plurality of symbols. The transmission of light to each of the elements is controlled by an individual occulting means for each element and each element comprising an optical light transmission system having an input end with a source surface, the illumination of which is controlled by its associated occulting means, and an output end with an image surface which reproduces the state of illumination of the source surface.

In essence, therefore, the present invention is concerned with the luminous display of letters, digits or symbols by continuous illumination of an overall surface having the form of the letter, digit or symbol which is to be displayed. The overall surface is produced by the lighting up of a certain number of contiguous elementary surfaces which will be referred to in the following as elementary "image" surfaces. The lighting up or extinguishing of such an elementary surface is effected by means of a shutter which makes it possible for another elementary surface, known as a "source" surface, to be lit up or extinguished. The source surface is associated with the elementary surface and is arranged opposite a light source, each elementary image surface thus in effect being connected to another elementary, source surface in proximity of which the shutter is located. When the source surface is lit up, the light is transmitted to the corresponding image surface at which a quasi-constant illumination is produced. The elementary image surfaces are contiguous whereas the elementary source surfaces are generally not so.

It should be noted that the conjugate elementary image and source surfaces may have different dimensions and geometric forms and occupy arbitrary positions in space, not necessarily opposite one another. As is evident in this disclosure, the plurality of image surfaces has various shapes and sized areas that are contiguous and form a cohesive, substantially continuous display area.

The transmission of light from the source surface to the conjugate image surface is effected by some suitable optical system or other, whether a light conductor or a light diffuser or a combination of both.

The source/image connection need not necessarily be established through a geometric optical device (conical or pyramidal frustum, with total or external reflection); it could be established through elements of arbitrary form having optical properties on the scale of the structure (diffusion, diffraction, luminescence).

The present invention likewise relates to a shutter device associated with each elementary source surface and to the method of controlling same in order to arbitrarily place it in the open or closed (occulting) position.

BRIEF DESCRIPTION OF DRAWINGS

The foregoing and further features of the invention may be more readily understood from the following description of some preferred embodiments, by way of example, with reference to the accompanying drawings, in which:

FIG. 3 is a schematic, sectional view of a variant embodiment of the present invention, illustrating a shutter ball in the operative position and another in the inoperative position;

FIGS. 4 and 5 are similar views of two other variant embodiments;

DESCRIPTION OF SPECIFIC EMBODIMENTS

Figure 1:
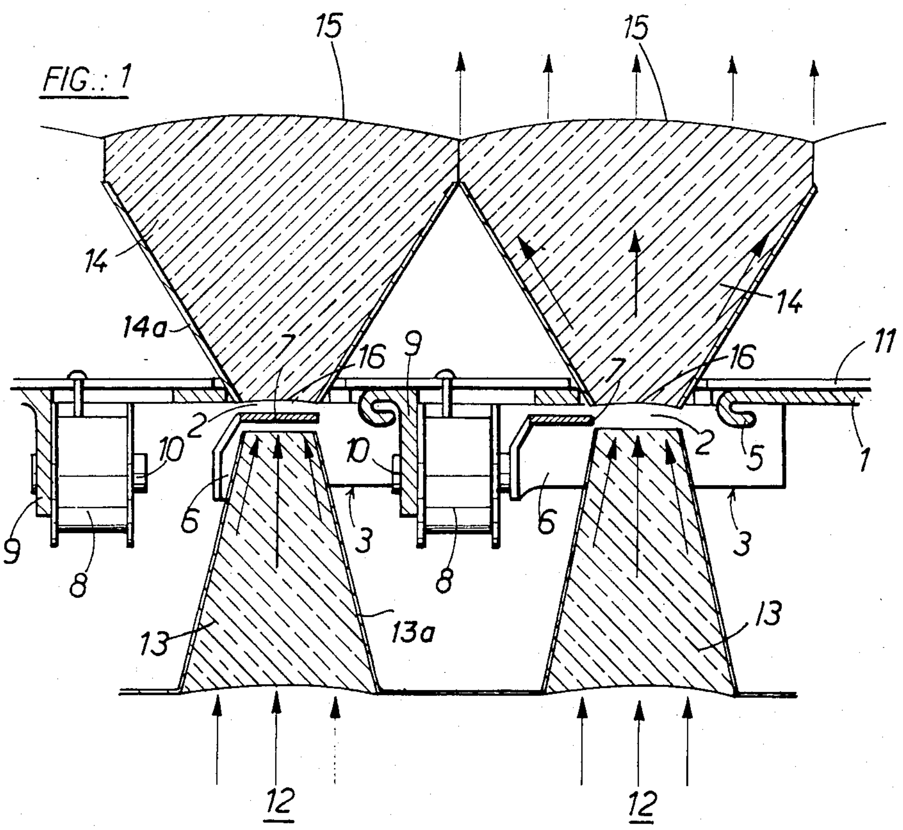
FIG. 1 is a schematic, fragmentary, sectional view of an embodiment of the present invention.
Figure 2:
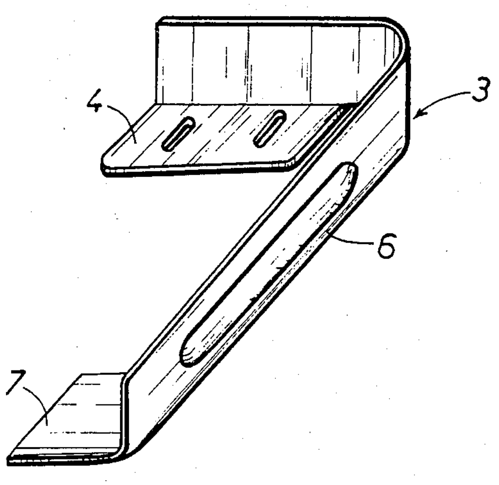
FIG. 2 illustrates in perspective a constructional detail on a larger scale.

In FIGS. 1 and 2, a plate 1 contains light transmission holes 2 and acts as a support for shutter elements 3 made of a thin ferromagnetic material, each equipped with a base 4 for attachment to the plate support 1 by means of bent over tongues 5. The base 4 is integral with a flexible strip or arm 6 terminating in a shutter proper 7 which is designed to open or close a light transmission hole 2.

The control of the shutter element 3 is effected by an electromagnet 8 which is attached to the support plate 1 by a bent over portion 9 also serving to close the magnetic circuit. The electromagnet 8 has a core 10 designed to attract the arm 6 so that the light transmission hole 2 is opened. The elasticity of the arm provides a restoring force which causes the light transmission hole 2 to close again when the electromagnet 8 is de-energized. The energizing and de-energizing of the various electromagnets 8 (whose supply conductors are formed by printed circuit 11 and taken to a connector for each module) is controlled in the usual fashion by the operator from his control console, through the medium of conventional electronic selection arrangements.

The optical section of the embodiment comprises a module having a common light source 12, a light condenser 13 and a diffuser 14 respectively upstream and downstream of each hole 2 13a and 14a, respectively. The diffuser 14 includes both with reflective coatings, the visible (or read-out) surfaces 15.

The large base or read-out surface 15 of each of the optical diffusers 14, constitutes an elementary image surface which is visible to an observer. Each diffuser 14 has a small base 16 constituting an elementary source surface which can be illuminated by the light source 12.

In the variant embodiment shown in FIG. 3, the electromagnet coils 8 for which the switch controlling the energizing has been shown at 8a, are each combined with a permanent magnet 9 of annular form around which they are wound. The assembly is disposed in such a fashion as to allow free passage of light through the holes 2. The holes 2 open on to the small bases 16 of the optical diffusers 14, which bases 16 are designed as spherical seatings for a loose ball 17, in each case. Each ball 17 can move in the location constituted by the opening of the hole 2 and a retaining lip 18.

The ball 17 could be made either of a magnetic material, solid or hollow, or of a non-magnetic material to which magnetic properties have been imparted by addition, for example by metallizing a non-magnetic sphere or by including magnetic particles in the material used at the time of molding or machining the balls. In a general fashion, the object will be to produce balls 17 as light as possible and have the lowest possible inertia.

In the bottom part of FIG. 3, the ball 17 can be seen in the closed position against its seat 16. In the top part of FIG. 3, ball 17 is in the open position, allowing the light beam F to pass. In the open position, ball 17 will have dropped to the bottom of its location 2 where it is retained by the lip 18.

In the example illustrated, the inoperative condition is characterized by the magnetic attraction of the ball 17 into the upward closed position, under the action of the permanent magnet 9, as shown at the bottom part of FIG. 3. By contrast, as shown at the top part of the same Figure, the operating condition characterized by the closing of the switch 8a and consequent energizing of the coil 8, results in the neutralization of the magnetic field of the permanent magnet 9 so that the ball 17 then drops under gravitational action away from the seat 16 into the disengaged (open) position.

Of course, the permanent magnets 9 could be discarded. Consequently, case the closed position on the part of the ball 17 would correspond with the state of energizing of the coil 8 and the open position with the de-energized state, the operative and inoperative states thus being the reverse of those described in the previous situation.

Another embodiment of this reversed situation of the operative and inoperative states is illustrated in FIG. 4. Here the ball is reduced to the form of a part spherical cap 17*a* or better a double cap, held in the lower, disengaged position, by the edge 18*a* of the curved base of the location 2.

In the variant embodiment shown in FIG. 5, the location 2 is disposed at the neck linking the condenser 13 and the diffuser 14. Ball 17 is at rest in the closed position shown at the top part of the Figure where it is retained by a stop 19. In the open position shown at the bottom part of the Figure, the ball 17 is attracted upwards by the energized coil 8.

The shutter ball of the embodiments hereinbefore described could alternatively be constituted by a mass of iron filings, by a small quantity of magnetic liquid, or by some other liquid material suitable for the required shutter function and contained in a spherical location such as that 17, the term ball extending to these various embodiments which have an at least partially spherical form.

Figure 6:
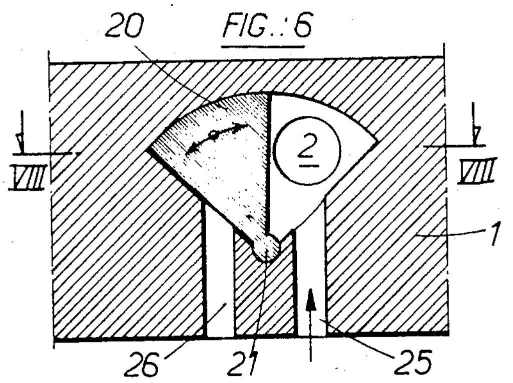
FIGS. 6 and 7 are schematic sections illustrating a pneumatically operated shutter device, respectively in the open position and in the closed position.
Figure 8:
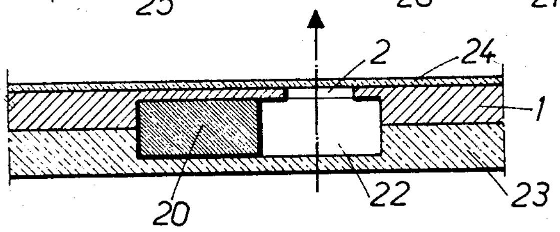
FIG. 8 is a transverse section on the line VIII—VIII of FIG. 6.

In the variant embodiment shown in FIGS. 6 and 8, the shutter is an opaque vane 20 movable in a plane parallel to the frontal plane, before the openings 2. The vane 20 pivots on a joint 21 inside a flat location 22 formed between two sheets or plates 23 and 24 of transparent plastic material between which there is sandwiched the plate 1 of an opaque plastic material containing the holes 2. In the opposite lateral walls of said location 22 there are air ducts 25, 26 which facilitate the supply of an air pulse to one side or the other of the vane 20.

Figure 7:
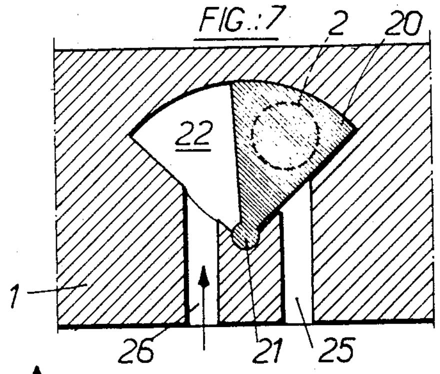

The vane 20 acts as a kind of angular piston and pivots into one or the other of its positions, either open (FIG. 6) or closed (FIG. 7). The pneumatic switching makes it possible to direct the air pulse in accordance with the arrow, either to the line 25 to produce opening, or to the line 26 to produce closing. No illustration of this pneumatic switching function is given since the technology of fluidics offers a vast range of this kind, i.e. bistable systems.

Figure 9:
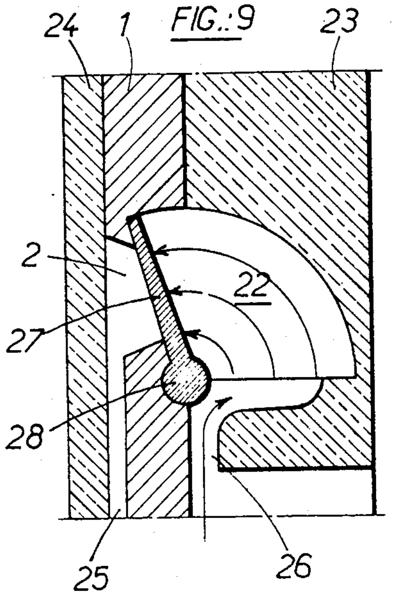
FIG. 9 is a schematic section showing a variant embodiment of a pneumatically controlled shutter device.

Instead of the vane 27 20 pivoting in a plane parallel to the frontal plane, a vane pivoting in a plane perpendicular thereto could be used as shown in FIG. 9. The axis of joint 28 is parallel to the frontal plane and vane 27 acts as a shutter flap in relation to the light transmission hole 2. Lines 25*a* and 26*a* provide the air pulse channels for operating vane 27.

Figure 10:
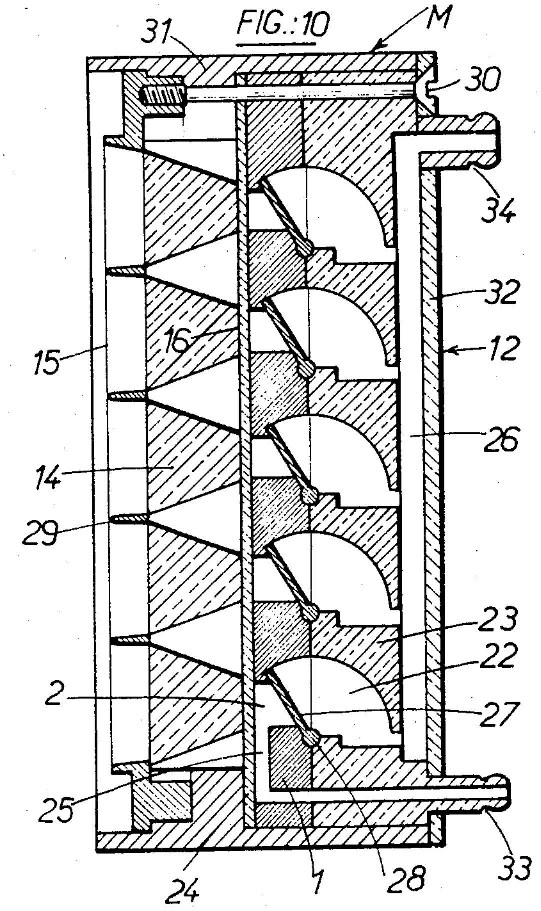
FIG. 10 is a sectional view of a module equipped with such a device.

FIG. 10 illustrates a module M having a plurality of vanes or shutter flaps 27 for the holes 22 which open on to the source surfces 16 disposed opposite the corresponding image surfaces 15 of the expanders or diffusers 14. Grating 29 acts as a partition preventing the free diffusion of light at the visible end of the expanders 14 and thus prevents the resultant halo and blurring effect which would otherwise be produced. The grating 29 is attached by screws 30 in a housing 31 lined with a transparent closure plate 32 at the face disposed towards the light source 12. Each flap 27 is associated with its own pneumatic line 25 which connects to a ferrule 33 providing the opening pulse (only one line has been shown although there are in fact as many as there are flaps 27). By contrast, the assembly of flaps 27 of the module M, is associated with a common pneumatic line 25 acting as a manifold, connected to a ferrule 34 designed to apply a pneumatic reset pulse which simultaneously closes all the flaps 27.

Figure 11:
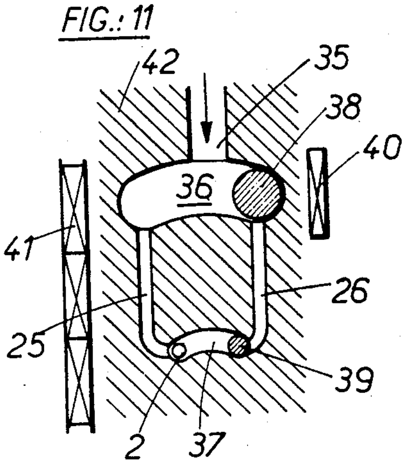
FIGS. 11 and 12 illustrate two other variant embodiments of such a device.

In the above embodiments, the control of the shutter employs either an electromagnetic field or a pneumatic pulse. Obviously control can be effected in a composite fashion electro-pneumatic means is shown in FIG. 11. A compressed air inlet 35 opens into a curved location 36 having a base which is curved convexly upwards. Two pneumatic passages 25 and 26 extend from the ends of location 36 and terminate in a second curved location 37 whose base is likewise curved convexly upwards. In the location 36 there is a poppet or ball 38 of magnetic material which can only stably occupy one or the other of two terminal positions, by virtue of the convex form of the base. Consequently, ball 38 thus shuts off either the passage 25 or the passage 26 (the latter is the situation which has been shown). Similarly, the location 37 contains a poppet or ball 39 of opaque material which can occupy tow extreme stable positions one of which coincides with the light transmission hole 2.

Each magnetic ball 38 cooperates with a coil 40 which, when energized, attracts the ball into the position in which it shuts off the passage 26 and opens the opposite passage 25. The pneumatic pulse passing through the latter thus forces the opaque ball 39 into the position in which it opens the hole 2, as shown in the drawing. Operating in opposition to the coil 40 responsible for the opening function, there are general closing coils 41 which place all the magnetic balls 38 in the position in which the passage 25 is closed off and that 26 opened, with the consequence that all the opaque balls 39 swing back into the position in which they close off the holes 2.

This system therefore constitutes a two-level bistable device the stability of whose states is ensured by the compressed air: the top level is the control level and the bottom level is the servo/level responsible for closing or opening the holes 2. This two-level arrangement makes it possible to group the control stage at a suitable location.

The assembly is bedded in a mass of plastic material 42.

Figure 12:
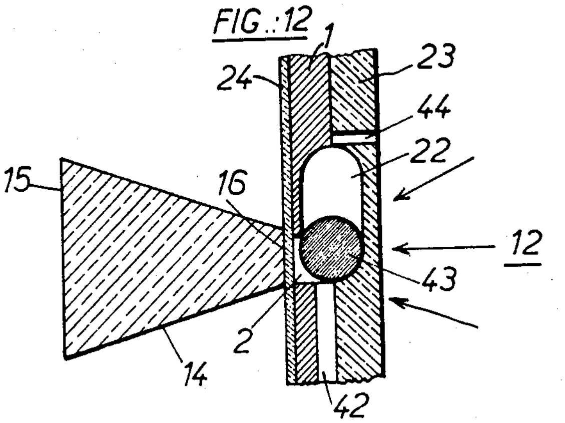

Instead of using pneumatic pulse operation as in the bistable devices of FIGS. 6 to 11, recourse can be had to a constant pressure system as in the variant, monostable embodiment of FIG. 12. Compressed air arriving through a feed line 42 lifts a ball 43 from its lower position, in which it closes off the hole 2, in a vertically upward direction towards the top of the location 22. Vent formed through the transparent plastics plate 23. The shutting off of the supply of compressed air through the line 42, immediately results in the ball 43 dropping back to its lower position in which it closes off the hole 2.

The expanders or diffusers 14 (and, as required, the condensers 13) are suitable devices commonly available in the field of optical technology. The prime function of the expanders 14 in accordance with the invention, is to transmit the state of illumination or extinction of the elementary source surfaces 16 to the elementary image surfaces 15 associated therewith, without at the same time imposing any conditions in terms of geometric conformation and mutual position.

Figure 13:
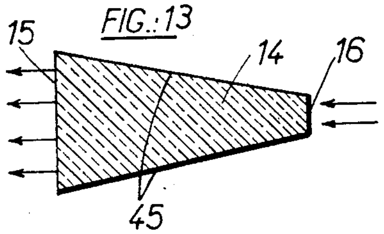
FIGS. 13 to 17 are highly schematic, fragmentary sectional illustrations of various examples of light expanders, it being understood that any condenser which is used performs the reverse function, transmission losses being excepted.

FIG. 13 illustrates a frusto-conical expander made of a transparent or translucent material having a high diffusion power, rendered effective by metallizing it or by giving it a reflective coating 45.

Figure 14:
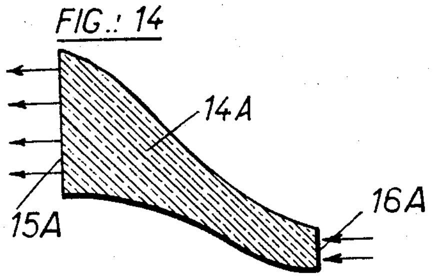

The expander 14A of FIG. 14 is similar to the foregoing with the exception that it is not a solid of revolution, its source surface 16A being offset in the translational sense and consequently no longer being opposite the image surface 15A.

Figure 15:
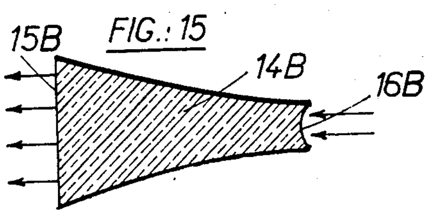

The expander 14B of FIG. 15, by contrast, is again a solid of revolution but with a curved generatrix giving it a concave lateral surface. Its terminal source surface 16B is likewise concave in order to produce divergence in the light rays and the transparent material of which it is made has a high refractive index. In this case, it is not essential to give the lateral surface a reflective finish, the phenomenon of total reflection being sufficient if the case requires.

Figure 16:
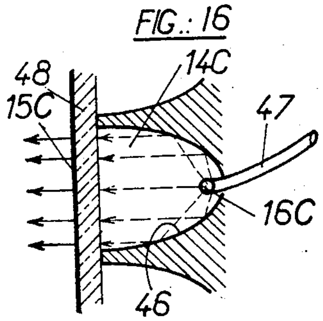

Instead of solid, physical expanders as described hitherto, it would be possible to use hollow expanders 14C (FIG. 16) with a parabolic reflective wall 46. The source surface 16C is at the focus and at the end of an optical conductor 47 while the image surface 15A would be on a diffuser panel 48 of transparent material.

Figure 17:
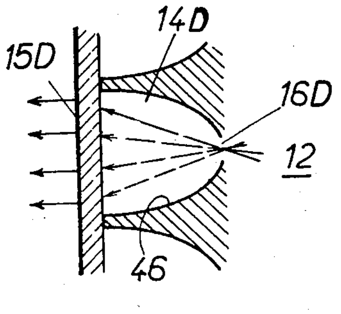

The expander 14D (FIG. 17) is also hollow and has a curved reflective wall 46, but it acts as a diffuser vis-a-vis light coming from an omnidirectional light source 12.

I claim:

1. A module for a display panel, comprising:

a. a plurality of distinct on-and-off optical systems, b. each system including an input end, light control means, an output end light transmitting means, c. said input end including a source surface facing inwardly of said module, d. said light control means optically associated with said source surface to control the illumination by a light source for selectively illuminating and obscuring said source surface, e. said output end being spaced from said input end and including an image surface facing outwardly of said module, f. said image surface being non-coextensive with said source surface, with the plurality of image surfaces being contiguous and having various shapes and sized areas to form a cohesive, substantially continuous display area, g. said light transmitting means extending between said source surface and said image surface for reverberating the illuminated or obscured state of said source surface to said image surface thereby bringing said image surface to a corresponding state of illumination or obscurity.

2. A module as claimed in claim 1, wherein said source surface and said image surface are in substantially eccentric relation with respect to one another whereby the optical axes of the respective surfaces are out of register with respect to each other.

3. A module as claimed in claim 1, wherein the geometrical shapes of said source and image surfaces are at variance with one another.

4. A module as claimed in claim 1, wherein the sizes of said source and images surfaces differ substantially form one another.

5. A module as claimed in claim 1, wherein said light transmitting means comprises a solid block of substantial optical material with said source surface and said image surface being disposed at opposite sides thereof.

6. A module as claimed in claim 5, wherein said light control means comprises an optical obturator positioned externally of said solid block of substantial optical material and movable adjacent said source surface, the consecutive source surfaces in said module are spaced apart from each other to provide operative room sufficient for accommodating for the corresponding movable obturator associated therewith.

7. A module as claimed in claim 6, wherein said source surface are substantially smaller in size than said image surfaces, and 1 said solid block of substantial optical material is designed to act as an optical expander.

8. A module as claimed in claim 7, wherein each optical system includes an optical condenser positioned ahead of said optical expander in the path of light through said system.

9. A module as claimed in claim 5, wherein said light transmitting means includes a reflective coating formed on the lateral side of said solid block intermediate said source surface and said image surface.

10. A module as claimed in claim, wherein said light transmitting means comprises a wall bounding a space separating said source surface from said image surface, and a reflective coating lining said wall.

11. A module as claimed in claim 1, wherein said source surfaces are composed of physically solid material.

12. A module for a display panel, comprising:

a. a plurality of distinct on-and-off optical systems for the transmission of light along a non-rectilinear optical path between an inwardly facing input end and an outwardly facing output end, b. said input and output ends being non-coextensive and eccentric with respect to each other, and c. controllable means respectively associated with each of said optical systems to control the illumination by a light source for selectively illuminating and obscuring said input end thereof, d. the plurality of output ends having various shapes and sized areas that are contiguous and form a cohesive, substantially continuous display area.

* * * * *